(12) United States Patent
Suzuki et al.

(10) Patent No.: US 10,783,340 B2
(45) Date of Patent: Sep. 22, 2020

(54) DATA DETERMINATION APPARATUS, LIBRARY APPARATUS, AND NON-TRANSITORY COMPUTER-READABLE RECORDING MEDIUM HAVING STORED THEREIN DATA DETERMINATION PROGRAM

(71) Applicant: FUJITSU LIMITED, Kawasaki-shi, Kanagawa (JP)

(72) Inventors: Noriyuki Suzuki, Katsushika (JP); Yoshiki Akiyama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 41 days.

(21) Appl. No.: 16/104,373

(22) Filed: Aug. 17, 2018

(65) Prior Publication Data
US 2019/0095664 A1   Mar. 28, 2019

(30) Foreign Application Priority Data
Sep. 27, 2017   (JP) .................. 2017-186096

(51) Int. Cl.
  *G06K 7/10*   (2006.01)
  *G06K 7/14*   (2006.01)
(52) U.S. Cl.
  CPC ....... *G06K 7/10722* (2013.01); *G06K 7/1413* (2013.01)
(58) Field of Classification Search
  CPC .......... G06K 7/10722; G06K 7/1413
  USPC ........... 235/462.1, 462.11, 462.41, 494
  See application file for complete search history.

(56) References Cited

U.S. PATENT DOCUMENTS

| | | | | |
|---|---|---|---|---|
| 5,313,533 A | * | 5/1994 | Scott ................ | H04N 1/403 358/465 |
| 5,418,862 A | * | 5/1995 | Zheng ............... | G06K 7/1092 235/462.1 |
| 6,081,627 A | * | 6/2000 | Kannon ............. | G06K 7/1093 235/494 |

FOREIGN PATENT DOCUMENTS

| | | |
|---|---|---|
| JP | 60-157678 | 8/1985 |
| JP | 2001-175804 | 6/2001 |

\* cited by examiner

*Primary Examiner* — Karl D Frech
(74) *Attorney, Agent, or Firm* — Staas & Halsey LLP

(57) ABSTRACT

A data determination apparatus includes: a memory; and a processor coupled to the memory. The processor is configured to: calculate a difference in signal values between each combination of neighboring pixels among a plurality of pixels forming image data of a barcode; compare a sum of a plurality of the differences with a reference value; and detect, based on a result of the comparing, a pixel at a boundary position at which a signal value of the pixel is switched from one of a first value and a second value to a remaining one of the first value and the second value among the plurality of pixels forming the image data.

15 Claims, 15 Drawing Sheets

DATA DETERMINATION APPARATUS, LIBRARY APPARATUS, AND NON-TRANSITORY COMPUTER-READABLE RECORDING MEDIUM HAVING STORED THEREIN DATA DETERMINATION PROGRAM

CROSS-REFERENCE TO RELATED APPLICATION

This application is based upon and claims the benefit of priority of the prior Japanese Patent Application No. 2017-186096, filed on Sep. 27, 2017, the entire contents of which are incorporated herein by reference.

FIELD

The embodiments discussed herein are related to a data determination apparatus for barcode data, a library apparatus, and a non-transitory computer-readable recording medium having stored therein a data determination program for barcode data.

BACKGROUND

A library apparatus that stores multiple medium cartridges (recording media) such as magnetic tape cartridges or optical disk cartridges has been known. In a library apparatus, medium cartridges are stored in multiple storing cells provided inside the casing in units of cells.

A library apparatus records data into or reproduces data from a medium placed in the drive module by, using a robot conveyer, picking up and conveying the medium cartridge between a storing cell and the drive module and placing (inserting) the medium cartridge into the drive module in response to a moving command from the host apparatus.

A barcode label on which a barcode containing medium management information is recorded is attached to the cartridge back face of a medium cartridge, and the barcode is read by a barcode reader mounted on the conveyor robot. The barcode reader includes a Light Emitting Diode (LED) lighting unit formed by linearly arranging LEDs and a Charge Coupled Device (CCD) linear sensor. The library apparatus can read a barcode (obtaining medium management information) by, in a state where the conveyor robot faces the cartridge back face (a barcode label), turning on the LED lighting unit, scanning the barcode with the CCD linear sensor, and decoding the result of the scanning.

Here, when the library apparatus is started or receives an instruction from a host apparatus, the library apparatus carries out an inventory process in which the medium management information and the position information of a storing cell for each medium cartridge being stored in the library apparatus are managed (registered) in association with each other.

While carrying out the inventory process, the library apparatus sequentially reads barcode labels attached to many medium cartridges stored in the apparatus and notifies the host apparatus of which medium cartridge being stored in which position of the apparatus. For example, the library apparatus moves the conveyor robot to the cell position at the top or bottom cell of the processing target column (arrangement of storing cells in the vertical direction) to position the conveyor robot, and then moves the robot conveyor upward or downward at a constant velocity while causing the barcode reader to carry out scanning. Thereby, the library apparatus sequentially reads the barcode labels of medium cartridges.

[Patent Document 1] Japanese Laid-Open Patent Publication No. 2001-175804

[Patent Document 2] Japanese Laid-Open Patent Publication No. 60-157678

Unfortunately, various factors caused from the environment of reading with the barcode reader may sometimes generate reading errors and misrecognition to fail to correctly reading a barcode. Although a retry process that reads the barcode again may be carried out, as a remedy to this case, the movement of the conveyor robot is mechanical operation and thus the retry process may delay the response time to the host apparatus.

In particular, a large-scale library apparatus stores as many as hundreds medium cartridges. The inventory process takes a longer time as the number of stored medium cartridges increases. For this reason, in cases where barcodes are not correctly read in the inventory process resulting to the frequent compel of the retry process, notification to the host apparatus is largely delayed and it takes a long time until the library apparatus is ready to operate.

The above inconvenience is not limited to a library apparatus, but may be caused in various apparatuses that read barcodes from management target on which barcodes are attached or printed.

SUMMARY

According to an aspect of the embodiments, a data determination apparatus includes: a memory; and a processor coupled to the memory, the processor being configured to: calculate a difference in signal values between each combination of neighboring pixels among a plurality of pixels forming image data of a barcode; compare a sum of a plurality of the differences with a reference value; and detect, based on a result of the comparing, a pixel at a boundary position at which a signal value of the pixel is switched from one of a first value and a second value to a remaining one of the first value and the second value among the plurality of pixels forming the image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment will be described with reference to the drawings. However, the embodiment described below is merely an example and is not intended to exclude the application of techniques and various modifications not described below. The present embodiment may be variously modified without departing from the scope thereof. Throughout the drawings for describing the following embodiment, like reference numbers designate the same or substantially the same parts and elements unless otherwise specified.

(1) Embodiment (1-1) Library Apparatus

First of all, description will now be made according to a library apparatus according to one embodiment with reference to FIGS. 1-5.

Figure 1:
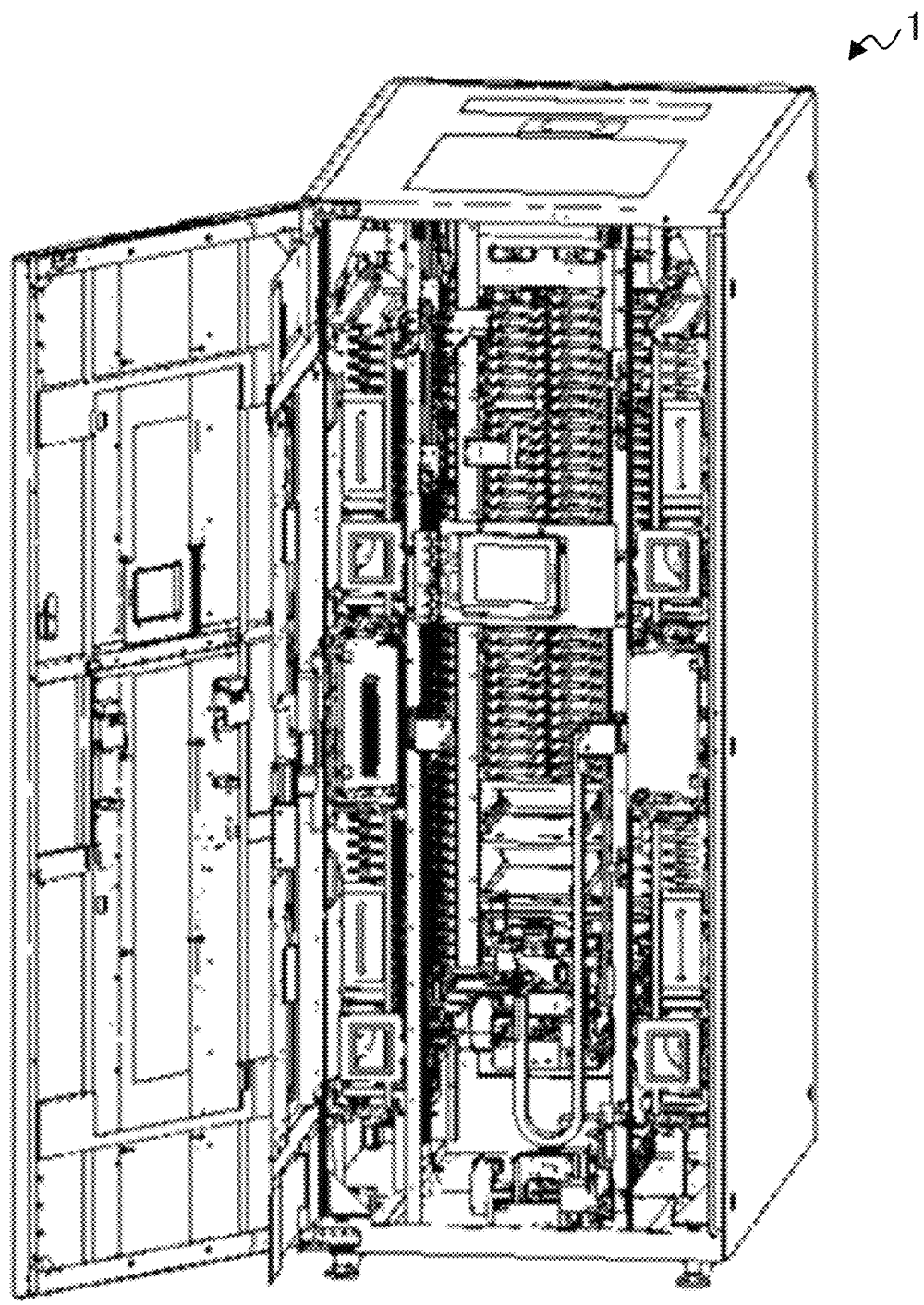
FIG. 1 is an perspective view illustrating an example of a library apparatus according to an embodiment.

FIG. 1 is an perspective view illustrating an example of a library apparatus 1 according to one embodiment. As illustrated in FIG. 1, the library apparatus 1 is a rack-type apparatus that can be installed in a premises, such as a data center or a server room. Alternatively, the library apparatus 1 may be a modular-type apparatus larger in scale in other embodiment.

Figure 2:
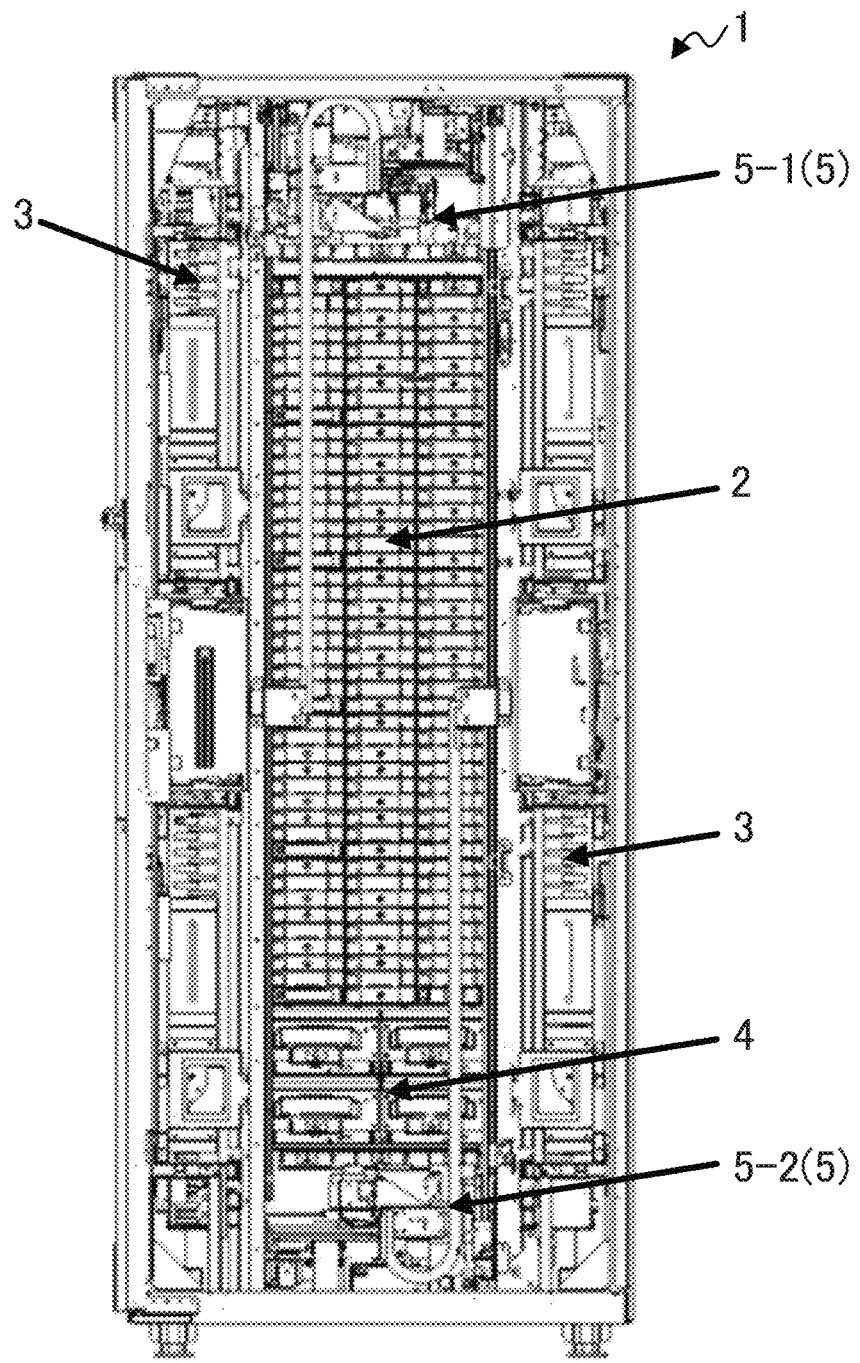
FIG. 2 is a front view of a library apparatus of FIG. 1.

FIG. 2 is a front view of the library apparatus 1 of FIG. 1. The library apparatus 1 includes a back cell 2 disposed at the front back inside the rack and side cells 3 disposed at the both side faces inside the rack. On each of the back cell 2 and the side cells 3, multiple storing cells are formed to store medium cartridges. The library apparatus 1 (the back cell 2 and the side cells 3) according to one embodiment can store hundreds of medium cartridges 6.

The library apparatus 1 includes a drive module 4, an upper robot 5-1 and a lower-robot 5-2 (hereinafter, when these robots are not discriminated from each other, referred to as conveyor robot 5).

The drive module 4 records data into and reproduces data from a medium in a placed (inserted) medium cartridge 6 (see FIG. 5) in response to a command from a host apparatus 7 or a upper controller 8 (see FIG. 5), which will be detailed below.

The conveyor robot 5 picks up, conveys, and places (inserts) a medium cartridge 6 between a storing cell and the drive module 4 in response to an instruction from the host apparatus 7 or the upper controller 8.

Figure 3:
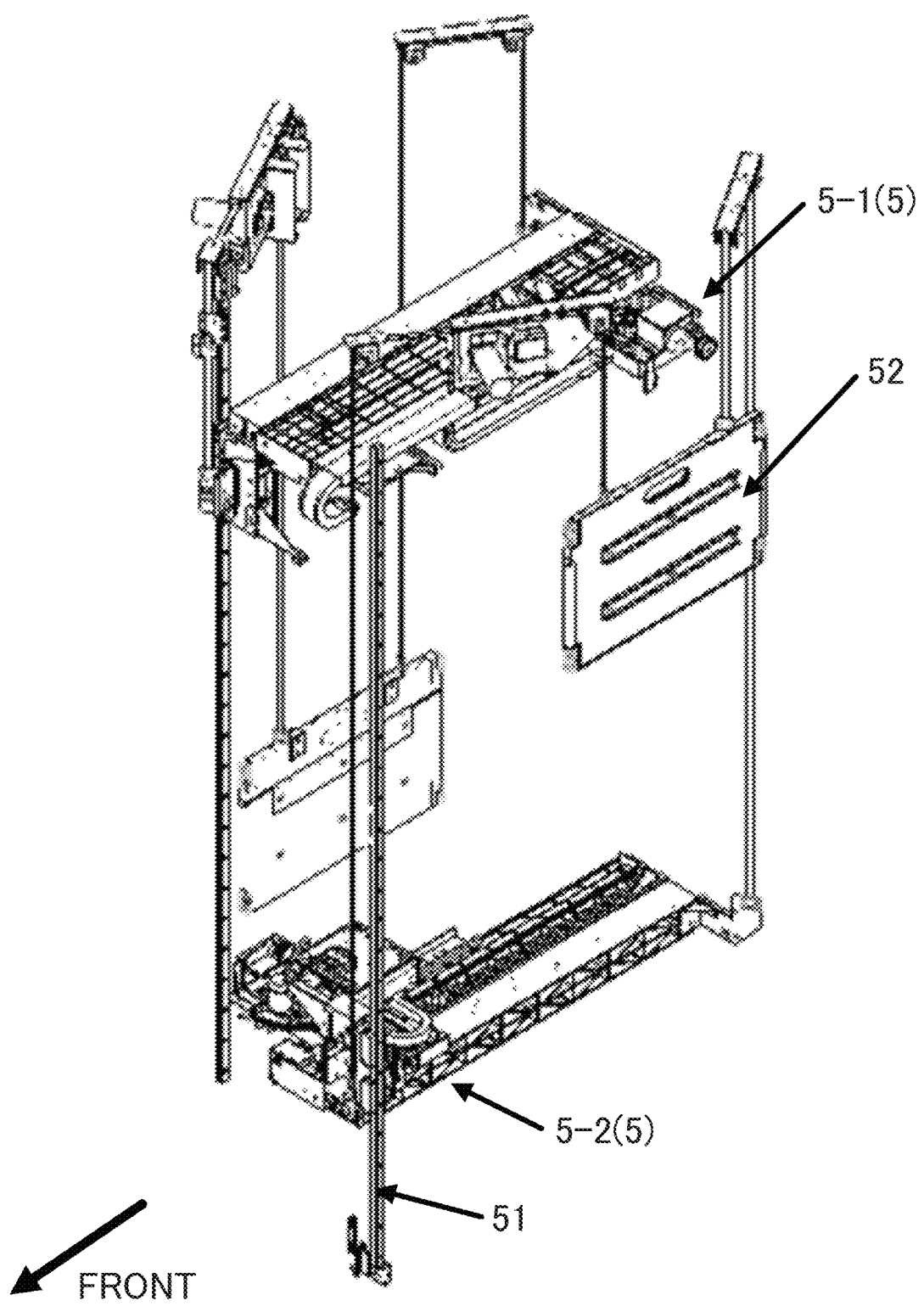
FIG. 3 is an perspective view extracting the configuration related to a conveyor robot from a library apparatus of FIG. 1.

FIG. 3 is an perspective view extracting the configuration related to the conveyor robot 5 from the library apparatus 1 of FIG. 1. Being driven by a motor and guided by a rail (Y mechanism) 51, the conveyor robot 5 can vertically move in the rack. Furthermore, the conveyor robot 5 is controlled to keep the horizontal attitude by a balancer 52.

Figure 4:
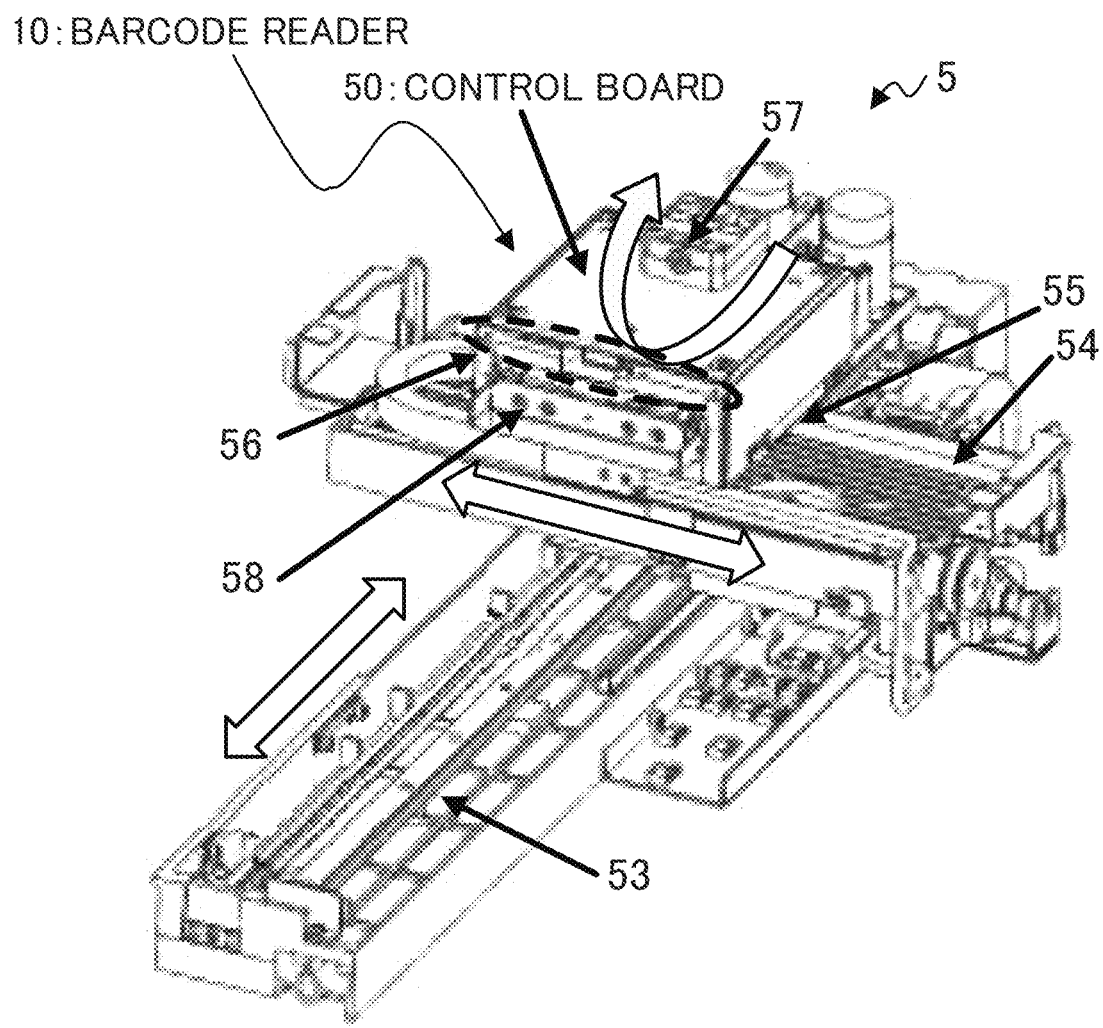
FIG. 4 is a diagram illustrating an example of the configuration of a conveyor robot and the peripheral thereof.

FIG. 4 illustrates an example of configuration of the conveyor robot 5 and the peripherals thereof. The conveyor robot 5 can be arbitrary move in the horizontal direction in the rack by a Z mechanism 53, an X mechanism 54, and a swivel mechanism 55 that are driven by respective motors. The Z mechanism 53 moves the conveyor robot 5 in the depth direction of the rack and the X mechanism 54 moves the conveyor robot 5 in the left-right direction of the rack. The swivel mechanism 55 rotates the conveyor robot 5 on the horizontal face (X-Z plane) in a range of approximately 270°. The conveyor robot 5 moves a medium cartridge 6 being held by a hand mechanism 58 from a movement source to a movement destination using the rail 51, the Z mechanism 53, and the X mechanism 54, and arranges the medium cartridge 6 to face the storing cell of the movement destination or the drive module 4 by the swivel mechanism 55.

A LED lighting unit 56 may have a configuration of linearly arranging multiple LEDs and is an example of a light source that irradiates a barcode label 6a (see FIG. 6) of a medium cartridge 6 with light.

A CCD linear sensor 57 is an example of an image sensor. The CCD linear sensor 57 may have a structure of linearly arranging multiple photodiodes each coupled to a CCD. The CCD linear sensor 57 detects reflected light from the barcode label 6a when being irradiated with the light from the LED lighting unit 56, and converts the detected reflected light into an electric signal such as a voltage signal. The CCD linear sensor 57 is an example of a reader that outputs series of read barcode data consisting of multiple pieces of data in response to a reading instruction from the host apparatus 7 or the upper controller 8. In other words, the CCD linear sensor 57 takes a picture of a barcode and obtains the image of the barcode in cooperation with the LED lighting unit 56.

Figure 7:
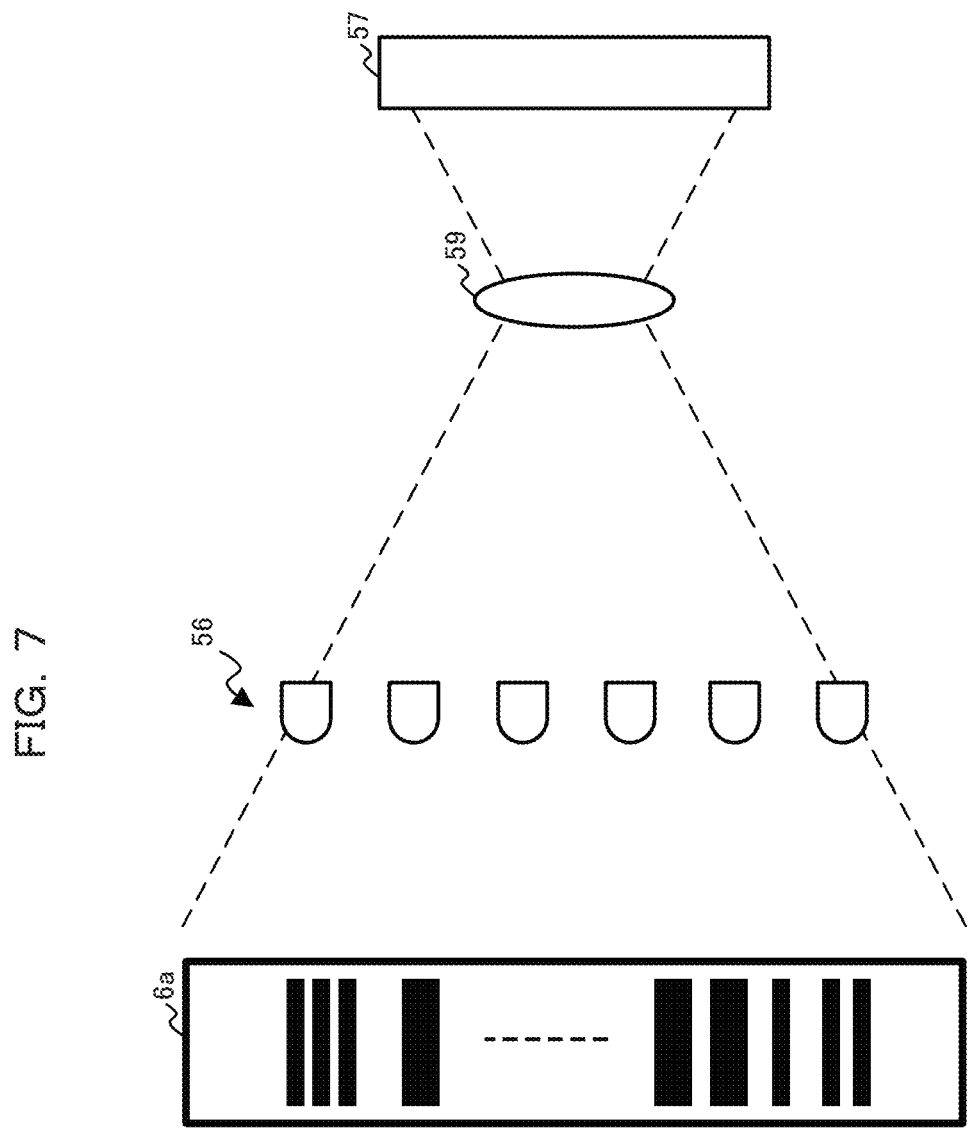
FIG. 7 is a diagram illustrating an example of a lens interposed between an LED lighting unit and a CCD linear sensor.

As illustrated in FIG. 7, between the LED lighting unit 56 and the CCD linear sensor 57, a lens 59 may be interposed which forms, on the CCD linear sensor 57, an image of reflected light of the light irradiated a barcode label 6a by the LED lighting unit 56. Besides, between the CCD linear sensor 57 and an A/D converter 13 (see FIG. 11) that is to be detailed below, an amplifier (not illustrated) may be disposed which amplifies an output signal from the CCD linear sensor 57.

The hand mechanism 58 includes a hand portion, such as a claw or an arm, which grasps a medium cartridge 6, and an accommodating portion that accommodates the medium cartridge 6 grasped by the hand portion. The hand mechanism 58 picks up (removes) a medium cartridge 6 from a storing cell of the movement source or the drive module 4, accommodates the medium cartridge 6 in the conveyor robot 5, and places (inserts) the medium cartridge 6 into the storing cell of the movement destination or the drive module 4.

The conveyor robot 5 includes a control board 50 that reads the barcode label 6a of a medium cartridge 6 by controlling the LED lighting unit 56 and the CCD linear sensor 57, and transmits the result of the reading to the upper controller 8. An example of the control board 50 is a printed board (circuit board) that includes at least one integrated circuit (IC) such as a Central Processing Unit (CPU), a Micro Processing Unit (MPU), a DSP (Digital Signal Processor), an Application Specific Integrated Circuit (ASIC), and a Field-Programmable Gate Array (FPGA).

The control board 50 may recognize bar information of a barcode label 6a by extracting the bar information included in the barcode label 6a from an electric signal output from the CCD linear sensor 57.

A barcode expresses information with a difference of the colors (e.g., two digits of "black" and "white") of printed bars and a difference of the width (e.g., two types of "thick" or "thin") of printed bars. For this reason, the control board 50 may detect boundaries between black and white of a barcode from an electric signal (of the image) output from the CCD linear sensor 57.

As described above, the LED lighting unit 56, the CCD linear sensor 57, and the control board 50 can collectively function as a barcode reader 10 that reads the barcode of a medium cartridge 6 in response to a reading instruction the barcode.

A medium cartridge 6 is an example of a recording medium, such as a magnetic tape cartridge and an optical disk cartridge, that stores data. An example of a magnetic tape cartridge is a Linear Tape-Open Ultrium (LTO) tape. Examples of an optical disk cartridge are cartridges that store a Compact Disc (CD) a Digital Versatile Disc (DVD), a Blu-Ray disk, and a Holographic Versatile Disc (HVD). Examples of a CD are a CD-ROM, a CD-Recordable (CD-R) and a CD-Rewritable (CD-RW). Examples of a DVD are a DVD-ROM, a DVD-RAM, a DVD-R, a DVD-RW, a DVD+R, and a DVD+RW. Among these examples of an optical disc, a rewritable optical disk is preferably used.

Hereinafter, the description of one embodiment assumes that the medium cartridge 6 is a magnetic tape cartridge and the drive module 4 is a tape drive.

Figure 5:
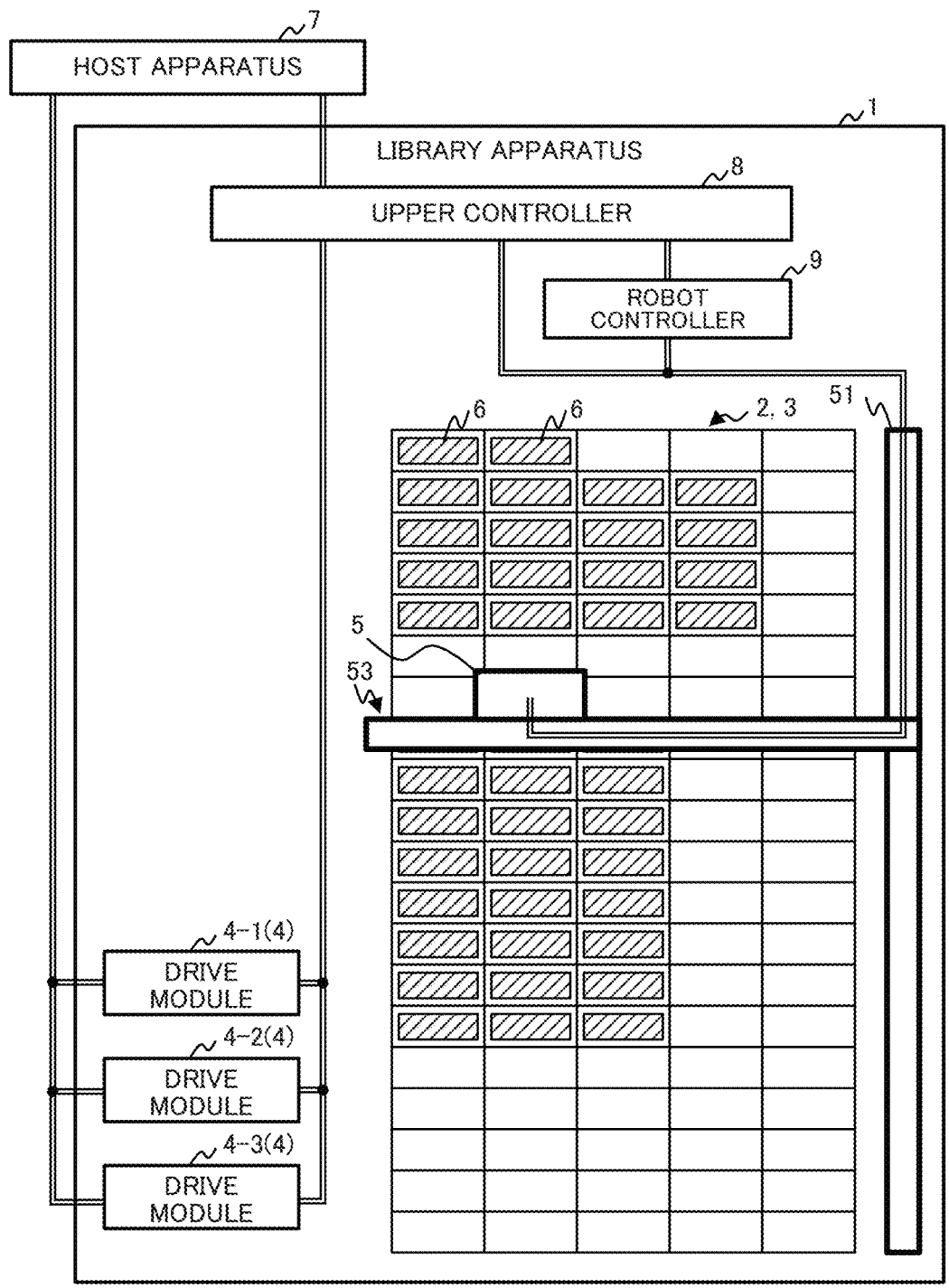
FIG. 5 is a diagram illustrating an example of operation of a library apparatus.

FIG. 5 is a diagram illustrating an example of operation of the library apparatus 1. The library apparatus 1 controls the conveyor robot 5 and the drive module 4 in response to an instruction from the host apparatus 7 connected thereto through a communication cable such as a Fiber Channel (FC).

The host apparatus 7 instructs the library apparatus 1 to place a medium cartridge 6 from the movement source to the movement destination in a storing cell or the drive module 4, record writing data into or reproducing reading data from the medium cartridge 6, and carry out the inventory process. The host apparatus 7 is an information processing apparatus or a computer such as a server or a Personal Computer (PC).

As illustrated in FIG. 5, the library apparatus 1 further includes the upper controller 8 and a robot controller 9 in addition to the back cell 2, the side cells 3, the drive module 4, and the conveyor robot 5 that are described above.

In response to an instruction from the host apparatus 7, the upper controller 8 controls the robot controller 9 to move the conveyor robot 5, the conveyor robot 5 to read a barcode label 6a, and the drive module 4 to record data into or reproduce data from a medium cartridge 6. An example of the upper controller 8 is an information processing apparatus that includes a processor such as a CPU, a memory such as a Random Access Memory (RAM), and a storage device such as a Hard Disk Drive (HDD) or a Solid State Drive (SSD). An example of the information processing apparatus is a computer such as a server or a PC.

The robot controller 9 controls driving of each motor that moves the conveyor robot 5 in response to an instruction (control) from the upper controller 8. The motors are a motor that vertically moves the conveyor robot 5 along the rail 51, a motor that moves the conveyor robot 5 in the depth direction and the left-right direction using the Z mechanism 53 and the X mechanism 54, and a motor of the swivel mechanism 55 that rotates the conveyor robot 5 on the X-Z plane. An example of the robot controller 9 is an integrating circuit such as an ASIC or an MPU.

The upper controller 8 carries out the inventory process to register a medium cartridge 6 stored in the back cell 2 or the side cell 3 when the library apparatus 1 is started or in response to an instruction from the host apparatus 7.

During the inventory process, the upper controller 8 instructs the robot controller 9 and the conveyor robot 5 to read medium management information of a medium cartridge 6 stored in a storing cell which information is exemplified by a volume number and notify the volume number and the position information of the storing cell to the upper controller 8. The robot controller 9 moves the conveyor robot 5 to the cell position at the top or bottom cell of the processing target column (arrangement of storing cells in the vertical direction) to position the conveyor robot 5, and then moves the conveyor robot 5 upward or downward at a constant velocity.

The conveyor robot 5 causes the barcode reader 10 to continuously scan the back faces (barcode labels 6a) of medium cartridges 6 in line with the movement of the conveyor robot 5 controlled by the robot controller 9. The result of the scanning is transmitted from the control board 50 to the upper controller 8 directly or through the robot controller 9. The upper controller 8 decodes the result of the scanning and obtains medium management information (volume numbers) through recognizing the letters of the barcodes. After checking all the storing cells is completed, the upper controller 8 notifies the host apparatus 7 of the collected volume numbers and the collected position information of the storing cells, and completes the inventory process.

The volume numbers and the position information collected through the inventory process are used to identify a medium cartridge 6 and the cell storing the medium cartridge 6 when the host apparatus 7 instructs an access to the medium cartridge 6.

Figure 6:
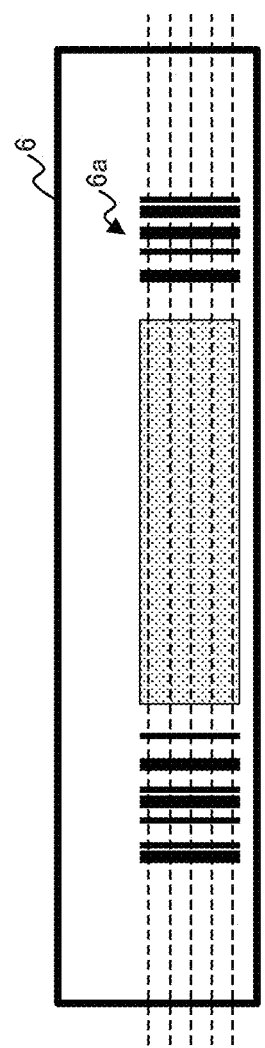
FIG. 6 is a diagram illustrating an example of a barcode label attached to a medium cartridge.

As illustrated in FIG. 6, the barcode reader 10 may scan a single barcode label 6a multiple times at different positions as indicated by broken lines, which positions are reached by moving upward or downward the conveyor robot 5. In this case, the upper controller 8 may determine that the reading of a barcode is succeeded if the barcode is recognized a predetermined number of times or more.

As described above, the library apparatus 1 is storable hundreds of medium cartridges 6. A faster inventory process is preferable as the number of stored medium cartridges 6 increases.

However, when the barcode reader is to read a barcode in, for example, the inventory process, the contrast of an image obtained by the image sensor may be degraded for various factors, which may generate a reading error or misrecognition, so that the library apparatus 1 may fail to correctly read the barcode.

Figure 8:
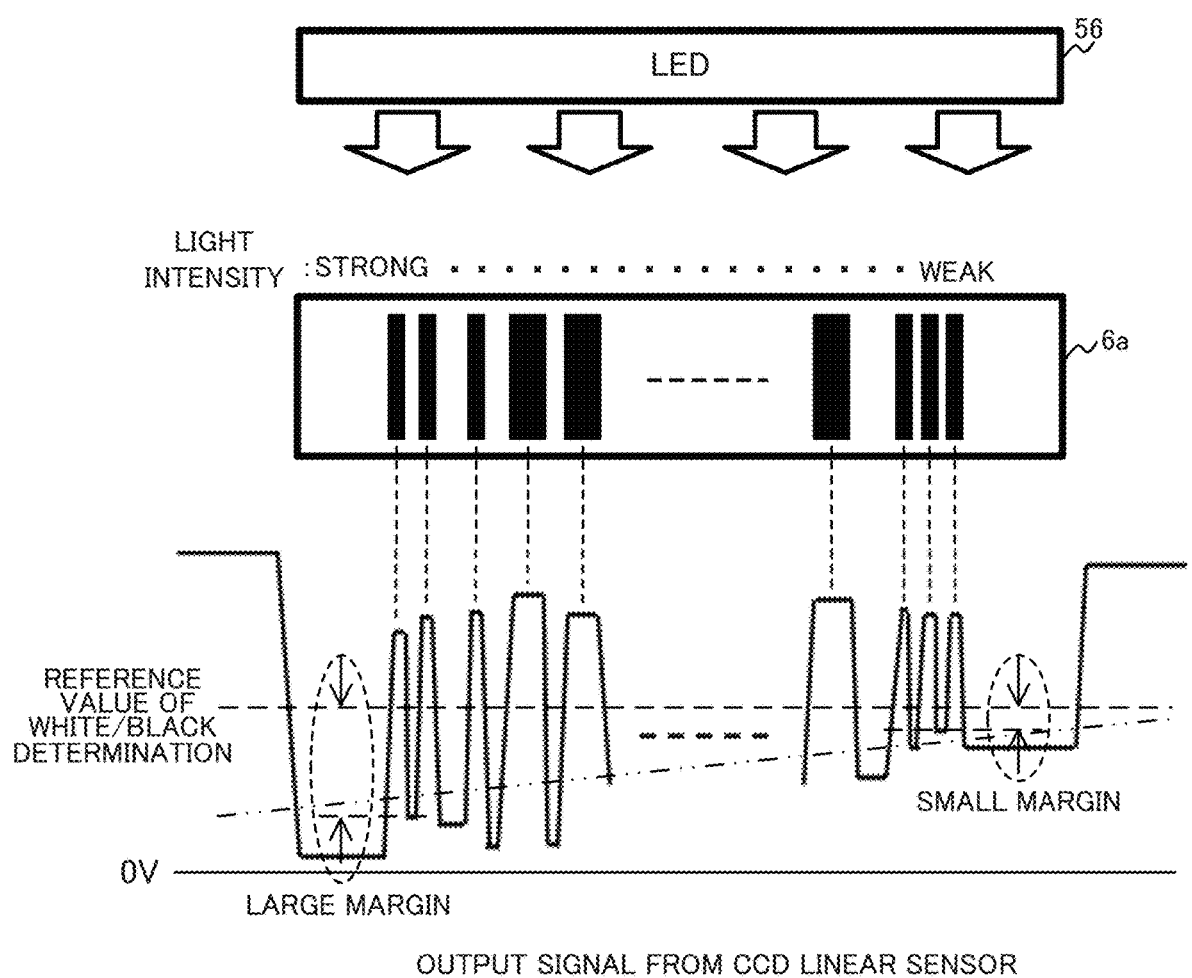
FIG. 8 is a diagram illustrating an example of a relationship between the precision of positioning a barcode reader with respect to a barcode label and an output signal from a CCD linear sensor.

As illustrated in FIG. 8, light emitted from the barcode reader attached to the movable conveyor robot 5 is reflected from the barcode label 6a and is detected by the CCD linear sensor. An output signal from the CCD linear sensor deviates due to the reflected light from the barcode label 6*a* and various factors. In the example of FIG. 8, the light intensity of the barcode label 6*a* is the strongest at the left end and is gradually weakened as approaching the right end.

In such a case, an output signal (voltage signal) according to the intensity of light received by the CCD linear sensor comes not to be even and thus the reading precision is degraded. In the example of FIG. 8, the outputting signal approaches a reference value to determine white or black of a barcode as approaching the right end from the left end of the barcode label 6*a*, which means that the margin comes to be smaller as approaching the right end. In other words, as the contrast is gradually degraded, the possibility of erroneous detection in the white/black determination increases.

As the factors for such degrading the contrast of an image obtained by an image sensor to result in a reading error or misrecognition, the following reasons (a)-(d) can be listed as examples:

(a) Difference in light reflectance due to difference in material of barcode labels 6*a*:

Barcode labels 6*a* are made of base materials that are different with manufacturers and that the most suitable for their apparatuses of the manufacturers, i.e., the library apparatuses 1 (the conveyor robots 5). A barcode reader of each manufacturer is frequently adjusted to optimally read barcode labels 6*a*.

A barcode reader using a monochrome CCD linear sensor usually uses a single value as the reference level to determine white/black of each bar of a barcode label 6*a*. For this reason, in cases where medium cartridges 6 with barcode labels 6*a* made of different base materials is used and stored in a library apparatus 1, the barcode labels 6*a* may have different light reflectance caused by differences in material of the barcode labels 6*a*. For this reason, there is a risk that the barcode reader sometimes generates a reading error.

In the case, re-reading of a barcode is repeated at reading levels variously changed, such a retry process needs a long time. Under a state where each barcode label 6*a* is scanned multiple times, scanning by changing the reading level retries multiple times of scanning and therefore has a possibility of delaying the response time to the host apparatus.

(b) Precision of positioning between a barcode reader and a barcode label 6*a*:

In cases where the precision of positioning between the conveyor robot 5 and the barcode label 6*a* is poor, the light emitted from the barcode reader attached to the movable conveyor robot 5 deviates when being reflected from a barcode label 6*a*. In the example of FIG. 8, in cases where the left end of the LED lighting unit 56 is near to the barcode label 6*a* and the right end is far from the barcode label 6*a*, the intensity of light is the strongest at the left end of the barcode label 6*a* and gradually reduces as approaching the right end. An example of poor precision of positioning is a case where the positional relationship, such as the distance and the angle, between a barcode label 6*a* and the CCD linear sensor or between barcode label 6*a* and the lens (see FIG. 7) is deviated.

(c) Brightness of the label face of a barcode label 6*a*.

The label face of a barcode label 6*a* may have an uneven brightness due to the light distribution characteristic of the lighting or the roughness of the label face.

(d) Blur of barcode printing of a barcode label 6*a*.

In cases where barcode printing of the barcode label 6*a* blurs, the boundary between white and black may be unclear.

Except for degrading the contrast due to the above factors (a)-(d), a reading error or misrecognition may occur in reading by the barcode reader for the following reason (e) as an example.

Figure 9:
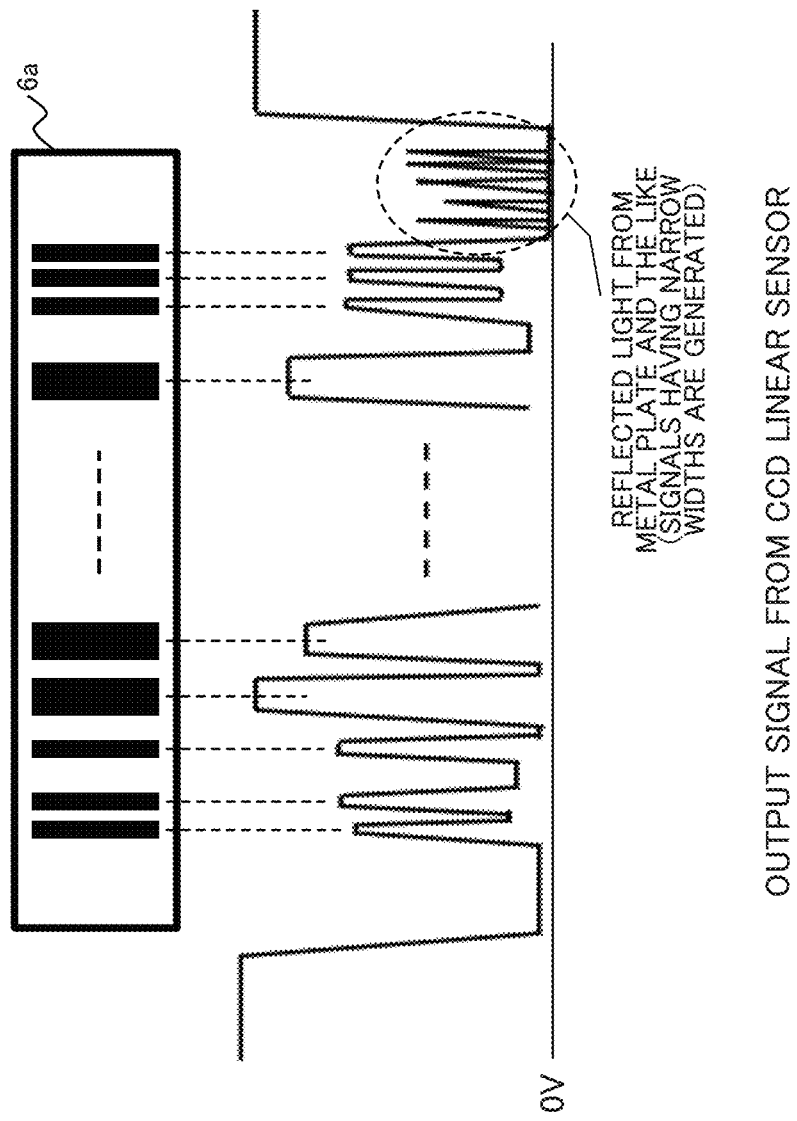
FIG. 9 is a diagram illustrating an example of an output signal from a CCD linear sensor when disturbance light is generated.

(e) Occurrence of reading error or misrecognition due to disturbance light caused by the metal plates of storing cells:

As illustrated in FIG. 9, the barcode reader may sometimes detect reflected light (disturbance light) from an object except for the barcode label 6*a*. The reflection light may cause the CCD linear sensor to generate noise (signals having narrow widths) on the signal output representing the end portion of the barcode label 6*a*, leading to misrecognition when the upper controller 8 is reading (decoding) the barcode.

Figure 10:
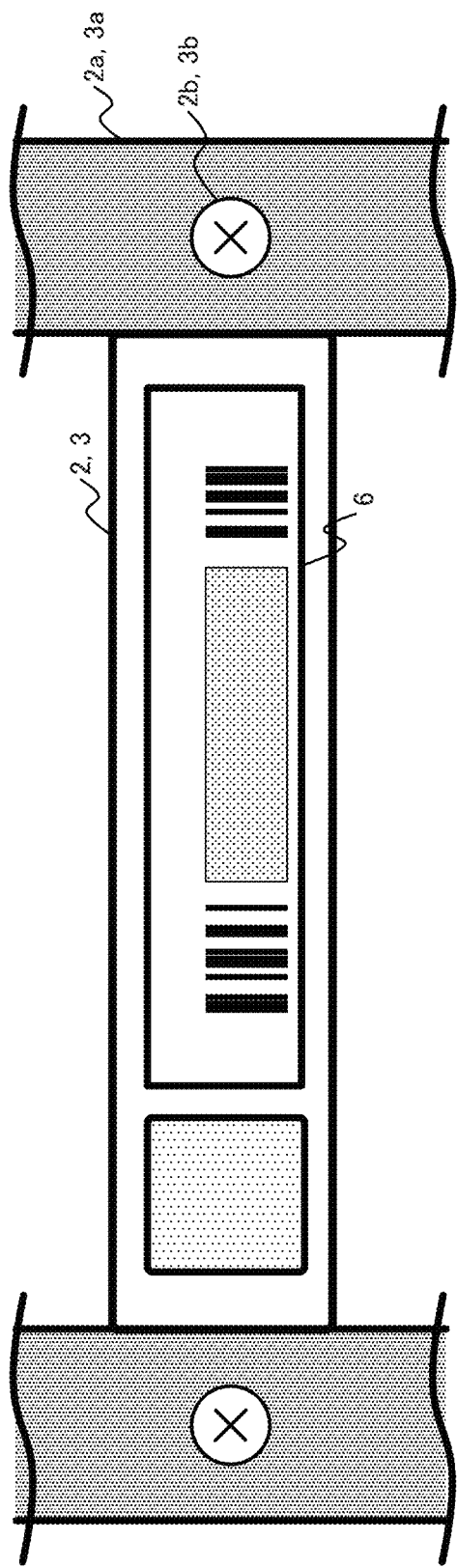
FIG. 10 is a diagram illustrating an example in which metal plates and screws of a back cell and side cells are painted in black.

In order to exactly read a barcode, by reducing misrecognition of the barcode, it is effective to take a reflection measure that suppress reflected light from an object except for the label around the barcode label 6*a*. One of the reflection measures is to paint the metal plates 2*a* and 3*a* and the screws 2*b* and 3*b* of the back cell 2 and the side cells 3 in black as illustrated in FIG. 10, which increases the cost of parts of the library apparatus 1.

As described above, the barcode reader may generate a reading error or misrecognition due to various factors.

Considering the above, the library apparatus 1 of one embodiment can enhance the performance of reading a barcode by using a barcode reader 10 that is to be detailed below. Hereinafter, description will now be made according to the barcode reader 10 of one embodiment.

(1-2) Barcode Reader

Figure 11:
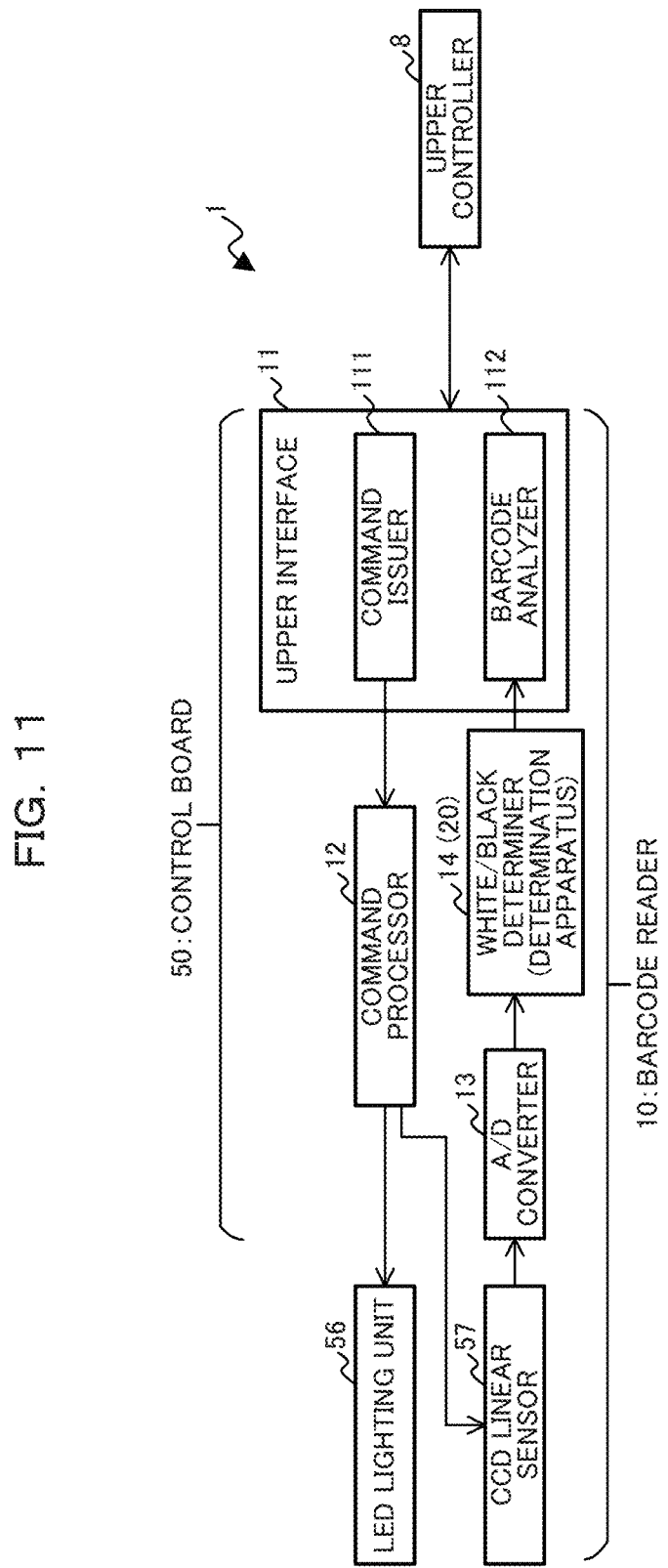
FIG. 11 is a diagram illustrating an example of the configuration of a barcode reader of an embodiment.

FIG. 11 is a diagram illustrating an example of a configuration of the barcode reader 10 of one embodiment. The barcode reader 10 exemplarily includes an upper interface 11, a command processor 12, an A/D converter 13, a white/black determiner 14, an LED lighting unit 56, and a CCD linear sensor 57. At least one of the upper interface 11, the command processor 12, the A/D converter 13, and the white/black determiner 14 may be implemented as an integrated circuit in the control board 50. As an example, the white/black determiner 14 may be configured by an FPGA being a reconfigurable circuit.

The upper interface 11 communicates with the upper controller 8 and exemplarily includes a command issuer 111 and a barcode analyzer 112.

The command issuer 111 issues a command to the command processor 12 which command is based on an instruction (command) received from the upper controller 8.

The barcode analyzer 112 analyzes data of a barcode on the basis of the result of white/black determination of each bar which result is input from the white/black determiner 14, decodes a result of scanning obtained by the analysis, transmits the decoded result to the upper controller 8.

The command processor 12 controls the LED lighting unit 56 to turn on and the CCD linear sensor 57 to scan in response to an instruction that the command issuer 111 receives from the upper controller 8.

The A/D converter 13 applies analog-to-digital conversion to the result of scanning a barcode by the CCD linear sensor 57, that is, scanning data (output signal, image) for one line (see FIG. 6) associated with the intensity of light from the LED lighting unit 56, and provide the obtained digital data to the white/black determiner 14.

The scanning data may be a digital converted value of, for example, a voltage level. Hereinafter, an output signal from the CCD linear sensor 57 is assumed to be converted into a data value of from zero to 255 by the A/D converter 13.

The A/D converter 13 may include a buffer that temporarily stores data to be output and may sequentially output data of one dot at a time from the buffer. For example, one dot may correspond to one light receiving element of the CCD linear sensor 57.

The white/black determiner 14 carries out white/black determining process on the scanning data converted into a digital signal by the A/D converter 13, and provides the result of the determination to the barcode analyzer 112. In other words, the white/black determiner 14 is an example of a determination apparatus 20 that determines the data of a barcode on a medium cartridge 6. For example, white/black determiner 14 may sequentially determine whether read value for a single dot included in the scanning data is black or white.

(1-3) Determination Apparatus

Figure 12:
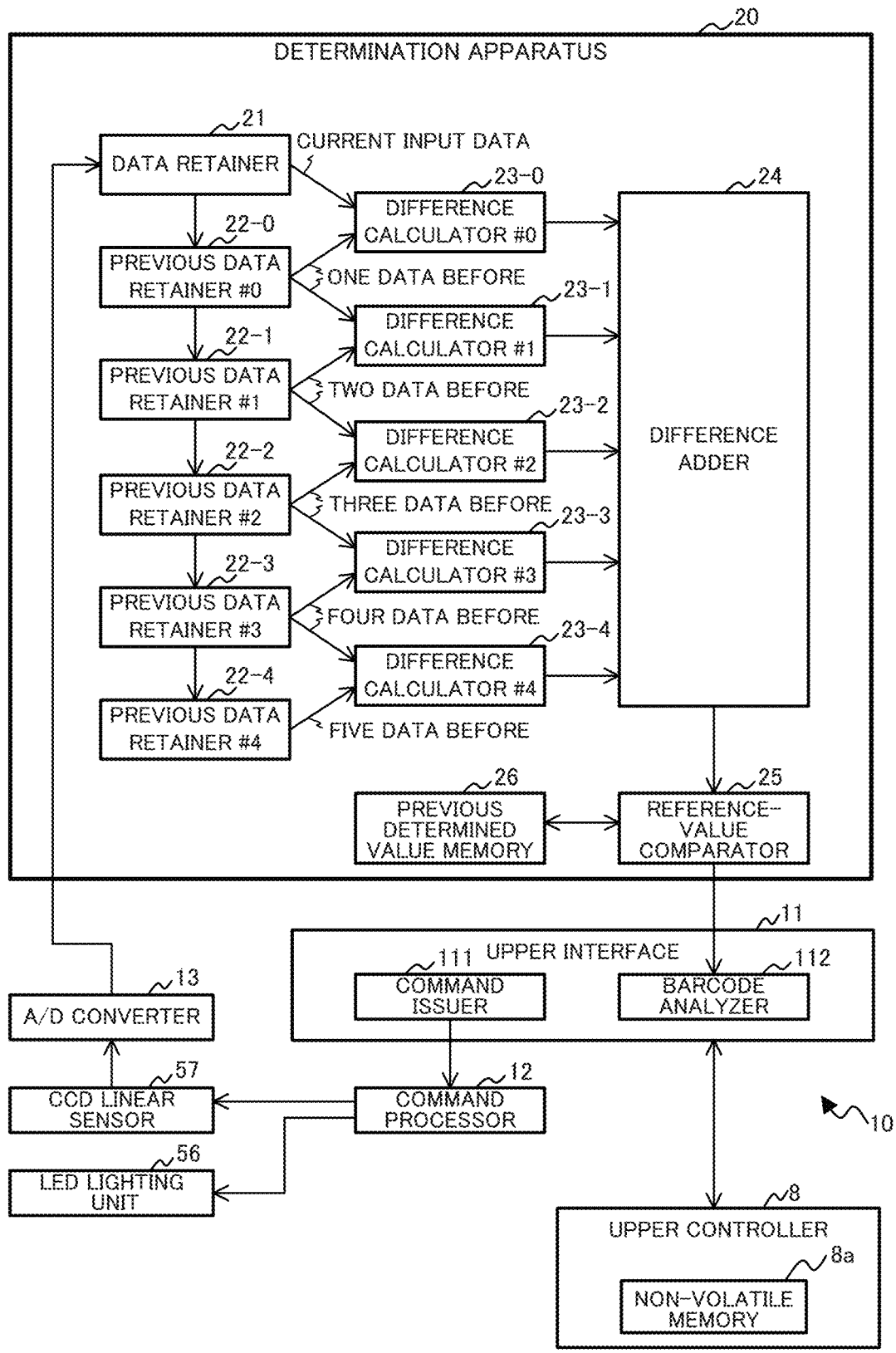
FIG. 12 is a diagram illustrating an example of the configuration of a determination apparatus of an embodiment.

Next, detailed description will now be made according to the determination apparatus 20 of one embodiment with reference to FIG. 12. As illustrated in FIG. 12, the determination apparatus 20 may exemplarily include a data retainer 21, previous data retainers 22-0 to 22-4, difference calculators 23-0 to 23-4, a difference adder 24, a reference-value comparator 25, and a previous determined value memory 26. Hereinafter, when the previous data retainers 22-0 to 22-4 are not discriminated from one another, the previous data retainers 22-0 to 22-4 are simply described to be the previous data retainers 22. Likewise, when the difference calculators 23-0 to 23-4 are not discriminated from one another, the difference calculators 23-0 to 23-4 are simply described to be the difference calculators 23.

The data retainer 21 retains a data value exemplified by information of a voltage level which value is part of the input scanning data of a barcode and is a determined target for the current determination, and provides the retaining data to the difference calculator 23-0 when the white/black determining process is to be made. In other words, the data retainer 21 retains the read value of the X-th dot in a barcode. Here, the symbol X represents a variable (integer) that varies in the range of one to N. The symbol N represents the total dot number contained in a single line.

The previous data retainers 22-0 to 22-4 (hereinafter also referred to as #0 to #4) retain data values input previously, and provide retaining previous data to the difference calculators 23-0 to 23-4 when the white/black determination is to be made.

For example, the previous data retainers 22-0 to 22-4 may retain in sequence read values of dots which were subjected to the determination at timings that come to be older (go back to the past) in the order of from previous data retainer 22-0 to the previous data retainer 22-4. As an example, when the data retainer 21 retains a read value of the X-th dot, the previous data retainers 22-0 to 22-4 may retain read values of the (X−1)-th to the (X−(n+1))-th dots, respectively. Here, the symbol "n" is an integer that represents the number of difference values $\Delta$ that are to be added in the difference adder 24 that is to be detailed below and can be regarded as the number of previous variation histories that are to be used for determining a single dot.

As a specific example, when the data retainer 21 retains the read value of the sixth dot, the previous data retainer 22-0 may retain the read value of the fifth dot; the previous data retainer 22-1 may retain the read value of the fourth dot; the previous data retainer 22-2 may retain the read value of the third dot; the previous data retainer 22-3 may retain the read value of the second dot; and the previous data retainer 22-4 may retain the read value of the first dot.

Namely, the data retainer 21, and the previous data retainers 22-0, 22-1, 22-2, 22-3, and 22-4 are controlled so as to shift the respective read value of a dot retained therein at one each time the determination apparatus 20 performs the white/black determination on one dot.

As described above, the data retainer 21 and the previous data retainers 22-0, 22-1, 22-2, 22-3, and 22-4 retain the read values of continuous (n+1) dots from the dot of the target for the current determination to the dot previous (past) by the predetermined number n.

Before the scanning, initial values "255" (black) may be set in the previous data retainers 22-0, 22-1, 22-2, 22-3, and 22-4.

The data retainer 21 and the previous data retainers 22-0 to 22-4 may provide data retained therein to the difference calculators 23-0 to 23-4. In the providing data, the read values of two continuous dots may be input into each of the difference calculators 23-0 to 23-4 and also neighboring difference calculators 23 may have dots shifted (different) by one each other.

As a specific example, the difference calculators 23-0 to 23-4 may be provided with the read values of the X-th and (X−1)-th dots, the (X−1)-th and (X−2)-th dots, ... , and the (X−(n+1))-th and (X−n)-th dots, respectively.

Specifically, the data retainer 21 may provide the current input data retained therein to the difference calculator 23-0; the previous data retainer 22-0 may provide one data before retained therein to the difference calculators 23-0 and 23-1; the previous data retainer 22-1 may provide two data before retained therein to the difference calculators 23-1 and 23-2; the previous data retainer 22-2 may provide three data before retained therein to the difference calculators 23-2 and 23-3; the previous data retainer 22-3 may provide four data before retained therein to the difference calculators 23-3 and 23-4; and the previous data retainer 22-4 may provide five data before retained therein to the difference calculator 23-4.

The data retainer 21 and the previous data retainers 22-0, 22-1, 22-2, 22-3, and 22-4 each may be achieved by a storage device such as a register, a Random Access Memory (RAM), and a flash memory.

The difference calculators 23-0 to 23-4 (hereinafter sometimes referred to as #0 to #4) calculate differences $\Delta X$ to $\Delta(X-n+1)$ of data input from the data retainer 21 and the previous data retainers 22, respectively, and provide the calculated differences to the difference adder 24.

For example, the difference calculator 23 may calculate the difference by subtracting the older one (farer to X) of the input read values of two neighboring dots from the newer one (nearer to X) of the input read values.

As one example, the difference calculator 23-0 may calculate a difference $\Delta X$ by subtracting one data before ((X−1)-th data) from the current input data (X-th data); the difference calculator 23-1 may calculate a difference $\Delta(X-1)$ by subtracting two data before ((X−2)-th data) from the one data before ((X−1)-th data); the difference calculator 23-2 may calculate a difference $\Delta(X-2)$ by subtracting three data before ((X−3)-th data) from the two data before ((X−2)-th data); the difference calculator 23-3 may calculate a difference $\Delta(X-3)$ by subtracting four data before ((X−4)-th data) from the three data before ((X−3)-th data); and the difference calculator 23-4 may calculate a difference $\Delta(X-4)$ by subtracting five data before ((X−5)-th data) from the four data before ((X−4)-th data). Thereby, n difference values are calculated.

As described above, the difference calculators 23 are an example of a calculator that calculates a difference between signal values of each combination of two neighboring pixels among multiple pixels of constituting the image data of a barcode. The difference calculators 23 serving as one example of the calculator calculates a difference between signal values of each combination of neighboring pixels of a predetermined number of continuous pixels among the multiple pixels constituting an image data.

The difference adder 24 calculates a difference sum $\Sigma X$ by adding the differences $\Delta X$ to $\Delta(X-n+1)$ input from difference calculators 23-0 to 23-4. The difference sum $\Sigma X$ output from the difference adder 24 is provided to the reference-value comparator 25.

The difference adder 24 can cancel fluctuation of the read values (voltage level) in the range from a dot of the target for the current determination to the n before dot and can thereby absorb the dispersion of the read value. Consequently, it is possible to suppress the erroneous determination between white and black of a barcode due to the above factors (a)–(e).

Here, the value represented by the symbol "n" coincides the number of previous data retainers 22 and also the number of difference calculators 23 and is preferably a number at least "three" or more. In one embodiment, the value "n" is "five". Since a larger number "n" makes it possible to use more read values of previous dots in the white/black determination, it is possible to suppress the erroneous determination between white and black of a barcode.

Meanwhile, in cases where the width of n dots (pixel) comes to be larger than the width of a narrow bar of the data obtained by the CCD linear sensor 57, the increase or decrease of a voltage level corresponding to the read value of the narrow bar may sometimes be cancelled. In this case, such a narrow bar is not detected, so that white/black portions of a barcode may be erroneously determined.

For this reason, the value "n", that is the sum of the differences, may be restricted to the number less than the number of pixels of a narrow bar in the image data of a barcode. For example, the value of "n" is preferably set such that the sum of the differences does not exceed the width of a narrow bar.

In the determination apparatus 20 of FIG. 12, when the value "n" is to be changed, the number of previous data retainers 22 and the number of difference calculators 23 may be changed to "n". In cases where the determination apparatus 20 is formed of an FPGA, an appropriate number of previous data retainers 22 and an appropriate number of difference calculators 23 may be configured according to the performance of the CCD linear sensor 57, or the positional relationship among the LED lighting unit 56, the lens 59, and the CCD linear sensor 57. Besides, in cases where the determination apparatus 20 is formed of an LSI, for example, the determination apparatus 20 may be configured by invalidating part of the previous data retainers 22 and the difference calculators 23 such that an appropriate number of previous data retainers 22 and an appropriate number of difference calculators 23 operate.

The previous determined value memory 26 stores the determined value of the previous ((X−1)-th) dot, which value is obtained by the reference-value comparator 25 and is exemplified by "255" (black) and "0" (white). The previous determined value memory 26 may be achieved by a storing device such as a register, a RAM, and a flash memory. The information stored in the previous determined value memory 26 may indicate, in the previous determination, whether the waveform formed by plotting the read values from the past to the previous determination is directed upward (tends to increase) or downward (tends to decrease).

The reference-value comparator 25 carries out the white/black determination on a bar on the basis of the difference sum $\Sigma X$ input from the difference adder 24 and a predetermined reference value. The result of the white/black determination made by the reference-value comparator 25 may be output to the barcode analyzer 112 of the upper interface 11 and also set in the previous determined value memory 26. The result of the determination may be stored in, for example, a register, a RAM, or a flash memory. The result of determination for one entire line of a barcode may be output in a lump after the white/black determination process on one line of a barcode is completed or the result of determination of each individual dot may be sequentially output after the white/black determination on the dot is completed.

As the predetermined reference value, different reference values may be used depending on whether the determined value of the previous ((X−1)-th) dot is "255" (black) or "0" (white). In other words, the reference value may vary with the result of determination made on the signal value of a target pixel for the determination before the shifting. The following description assumes that the first reference value of a negative value is used when the determined value of the previous ((X−1)-th) dot is "255" (black) and uses the second reference value of a positive value is used when the determined value of the previous ((X−1)-th) dot is "0" (white).

The first reference value and the second reference value may have the same absolute value as each other and different signs from each other, or may have different absolute values and different signs from each other. One or the both of the first reference value and the second reference value may be adaptively set in accordance with the installing and operating environment of the control board 50, the barcode reader 10, the conveyor robot 5, and the library apparatus 1. The installing and operating environment may include the conditions of, for example, the positional relationship between the conveyor robot 5 and a storing cell or between the conveyor robot 5 and the drive module 4 in the library apparatus 1, and the positional relationship from the LED lighting unit 56 to the CCD linear sensor 57. Furthermore, the installing and operating environment may include the conditions of, for example, the light emitting and receiving characteristics of the LED lighting unit 56 and the CCD linear sensor 57, respectively, the gain of the amplifier interposed between the CCD linear sensor 57 and the A/D converter 13, and the circuit characteristic of the white/black determiner 14. One or the both of the first reference value and the second reference value may be set in accordance with the value of "n".

For example, the reference-value comparator 25 obtains information set in the previous determined value memory 26, such as the determined value of the previous ((X−1)-th) dot and may perform the following process depending on whether the determined value of the previous ((X−1)-th) dot is "255" (black) and "0" (white). As one example, the reference-value comparator 25 may determine whether the difference sum $\Sigma X$ is larger or smaller than a predetermined reference value in accordance with the determined value of the previous ((X−1)-th) dot along the following logic (A) or (B). The reference-value comparator 25 may set "255" (black) or "0" (white) to be the result of the white/black determining process on the X-th dot, the target for the determination, in accordance with whether the difference sum $\Sigma X$ is larger or smaller than the predetermined reference value.

(A) The cases where the determined value of the previous ((X−1)-th) dot is "255" (black):

The reference-value comparator 25 determines whether or not the difference sum ΣX is less than the first reference value (negative value).

(A-1) Cases where the difference sum ΣX is less than the first reference value in the above cases (A):

The cases where the difference sum ΣX is less than the first reference value correspond to cases where the waveform declines (the voltage level decreases) across the first reference value. In the cases, the reference-value comparator 25 determines that the color of the bar changes from black to white and may set the result of the white/black determining process to "0" (white).

(A-2) Cases where the difference sum ΣX is equal to or more than the first reference value in the above cases (A):

The cases where the difference sum ΣX is equal to or more than the first reference value correspond to cases where the decline or rise of the waveform (decrease or increase of the voltage level) does not exceed the first reference value. In the cases, the reference-value comparator 25 determines that the color of the bar is unchanged from black and may set the result of the white/black determining process to "255" (black).

(B) Cases where the determined value of the previous ((X−1)-th) dot is "0" (white):

The reference-value comparator 25 determines whether or not the difference sum ΣX is larger than the second reference value (positive value).

(B-1) Cases where the difference sum ΣX is larger than the second reference value in the above cases (B):

The cases where the difference sum ΣX is larger than the second reference value correspond to cases where the waveform rises (voltage level increases) across the second reference value. In the cases, the reference-value comparator 25 determines that the color of the bar changes from white to black and may set the result of the white/black determining process to "255" (black).

(B-2) Cases where the difference sum ΣX is equal to or less than the second reference value in the above cases (B):

The cases where the difference sum ΣX is equal to or less than the second reference value correspond to cases where the decline or rise of the waveform (decrease or increase of the voltage level) does not reach the second reference value. In the cases, the reference-value comparator 25 determines that the color of the bar is unchanged from white and may set the result of the white/black determining process to "0" (white).

As described above, the reference-value comparator 25 is an example of a detector that compares the sum of multiple differences of a predetermined number of continuous pixels with reference values, and determines, on the basis of the result of the comparison, whether a the signal value of a target pixel for the determination among predetermined number of continuous pixels represents a first value or a second value.

After the determination of the reference-value comparator 25, the determination apparatus 20 shifts the range of the predetermined number of continuous pixels by one pixel among multiple pixels constituting the image data, keeping the predetermined number. Then, the determination apparatus 20 carries out the calculation by the difference calculator 23, and the comparison and determination by the reference-value comparator 25 on a predetermined number of continuous pixels, which has undergone the shifting. This can detect a change in color of the bar each time the range of pixels is shifted by one pixel, so that the detection omission of a change in color of the bar can be suppressed.

Figure 13:
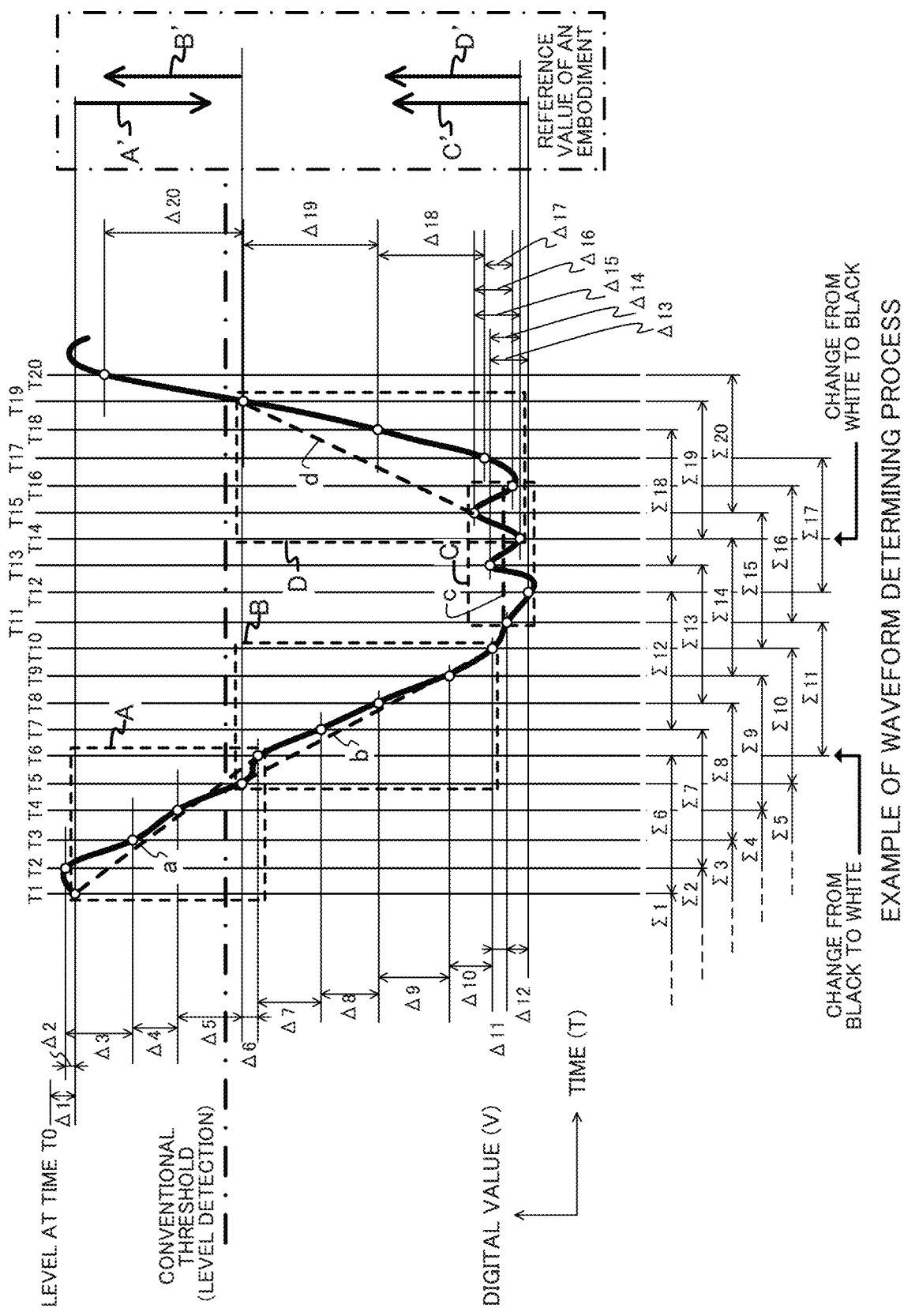
FIG. 13 is a diagram illustrating an example of a white/black determining process by a determination apparatus.

Next, description will now be made in relation to an example of the white/black determining process by the determination apparatus 20 with reference to FIG. 13. FIG. 13 is a diagram illustrating an example of the white/black determining process by the determination apparatus 20 and is more specifically a diagram illustrating an example digital values of dots of a single line output from the A/D converter 13 at times T1-T20.

In the example of FIG. 13, the coordinate axis represents a digital value reflecting the voltage level and the abscissa axis represents a time (T1-T20) at which the CCD linear sensor 57 sequentially obtains an image data in the scanning direction. In the example of FIG. 13, data corresponding to a black image has a high voltage level and has the maximum value of "255", and data corresponding to a white image has a low voltage level and has the minimum value of "0".

As illustrated in the example of FIG. 13, the data ΣX is obtained by summing the difference data ΔX from the previous read value a predetermined number of times (i.e., n times), and each time the read data (digital data) of a next dot is received from the A/D converter 13, the dot to be the target for addition is shifted to the right side (the latest read value).

Here, in a segment enclosed by a broken line A in FIG. 13, the difference sum Σ6 (corresponding to the height length of the segment enclosed by a broken line A) of Δ2-Δ6 in the sections T1-T6 has a negative value and is smaller than a predetermined first reference value (negative value; see symbol A'). The reference-value comparator 25 determines that the read value changes from "black" to "white" at the time point T6.

The values Δ-4 to Δ0 to be used to calculate difference sums Σ1 to Σ4 may be calculated to be (the initial value "255")−(the initial value "255")="0" by the difference calculator 23, and the value Δ1 to be used to calculate a difference sum Σ5 may be calculated by (the read value at T1)−(the initial value "255").

At the time points T7 and the subsequent thereto, since the value of the previous determined value "0" (white), the reference-value comparator 25 compares the difference sum ΣX with a second reference value.

For example, in a segment enclosed by a broken line B in FIG. 13, the difference sum Σ10 (corresponding to the height length of the segment enclosed by a broken line B) of Δ6-Δ10 in the sections T5-T10 has a negative value and is equal to or smaller than the predetermined second reference value (positive value; see symbol B'). The reference-value comparator 25 determines that the read value is unchanged from "white" at the time point T10.

In addition, in a segment enclosed by the broke line C in FIG. 13, the difference sum Σ16 (corresponding to the height length of the segment enclosed by a broken line C) of Δ12-Δ16 in the sections T11-T16 has a value near "0", which is equal to or smaller than the predetermined second reference value (positive value; see symbol C'). Therefore, the reference-value comparator 25 determines that the reading value is unchanged from "white" at the time point T16. Although the waveform in the segment C largely deviates for various factors, the deviation of waveform for various factors can be cancelled by calculating the difference sum Σ16 and comparing the difference sum Σ16 with a reference value, so that erroneous determination of a bar due to these factors can be suppressed.

In a segment enclosed by the broke line D in FIG. 13, the difference sum Σ19 (corresponding to the height length of the segment enclosed by a broken line D) of Δ15-Δ19 in the sections T14-T19 has a positive value and is larger than the predetermined second reference value (positive value; see symbol D'). For the above, the reference-value comparator 25 determines that the reading value changes from "white" to "black" at the time point T19.

In other words, it can be said that the reference-value comparator 25 obtains inclinations of the lines represented by symbols a-d from the value (height) of the difference sum Σ6 and the target range (dot, width) for the difference sum Σ6, and then determines the presence or absence of a change in color of the bar from the inclinations and the reference values. Since the inclination of each line changes with the value of "n", the reference values may be set in accordance with the value of "n". For example, the reference values are set to be larger as the value of "n" increases.

As described above, it can be said that the reference-value comparator 25 compares the sum of multiple differences with a reference value, and detects, on the basis of the result of the comparison, a pixel at a boundary position at which the signal value of a pixel is switched one of the first and second value to the other among multiple pixels constituting the image data. A pixel at a boundary position is a pixel which comes to be included in the predetermined number of continuous pixels by the shifting, that is, the X-th pixels that comes to be the target for the determination, and at which the color of the bar is determined to change. For example, in the example of FIG. 13, the dots at T6 and T14 can be regarded as the pixels at a boundary positions. In other words, each target pixel for the determination is a candidate for a pixel at a boundary position.

Here, a traditional method has used a fixed value as the threshold of the white/black determination of a bar as illustrated in FIG. 13. For example, the white/black determination determines that in cases the read value of a bar is the threshold or more, the bar is black, and in cases where the read value is less than the threshold, the bar is white. However, for the above various factors such as deterioration of a barcode label 6a and unevenness in lighting, the difference in obtained voltage level of the read waveform between a read value of a black dot and a read value of a white dot may sometimes come to be small. In this case, there is a risk that the margin of the white/black determination reduces and consequently the barcode is not correctly read.

In contrast to the above, the present embodiment can vary the threshold in accordance with the read values of multiple pixels and the value of determined value of the previous pixel. For example, the first threshold indicated by the symbol A' in FIG. 13 sets the threshold in the segment A (the tip of Arrow A'). The reference values indicated by the symbols B', C', and D' are the second reference values, and set the thresholds (the tips of Arrows B', C', and D') in the segments B, C, and D, respectively.

Accordingly, even under various states of, for example, degradation of the contrast of the image obtained by the image sensor or occurrence of disturbance, it is possible to suppress the reading error or misrecognition, so that the barcode can be correctly read.

In the above manner, the difference calculator 23 obtains the difference values between each combination of neighboring pixels, using the input signal values of each pixel received from the CCD linear sensor 57, which photographs the barcode label 6a. The difference adder 24 obtains the difference sum by adding the multiple obtained differences. Then the reference-value comparator 25 detects the boundary position between white and black of the barcode label 6a from the read image of the barcode by comparing the difference sum and a reference value.

Consequently, even in cases where the contrast of the input image data from the CCD linear sensor 57 is degraded in reading of the barcode label 6a, high precision white/black determination can be carried out, and therefore it is possible to enhance the precision of reading the barcode.

Figure 14:
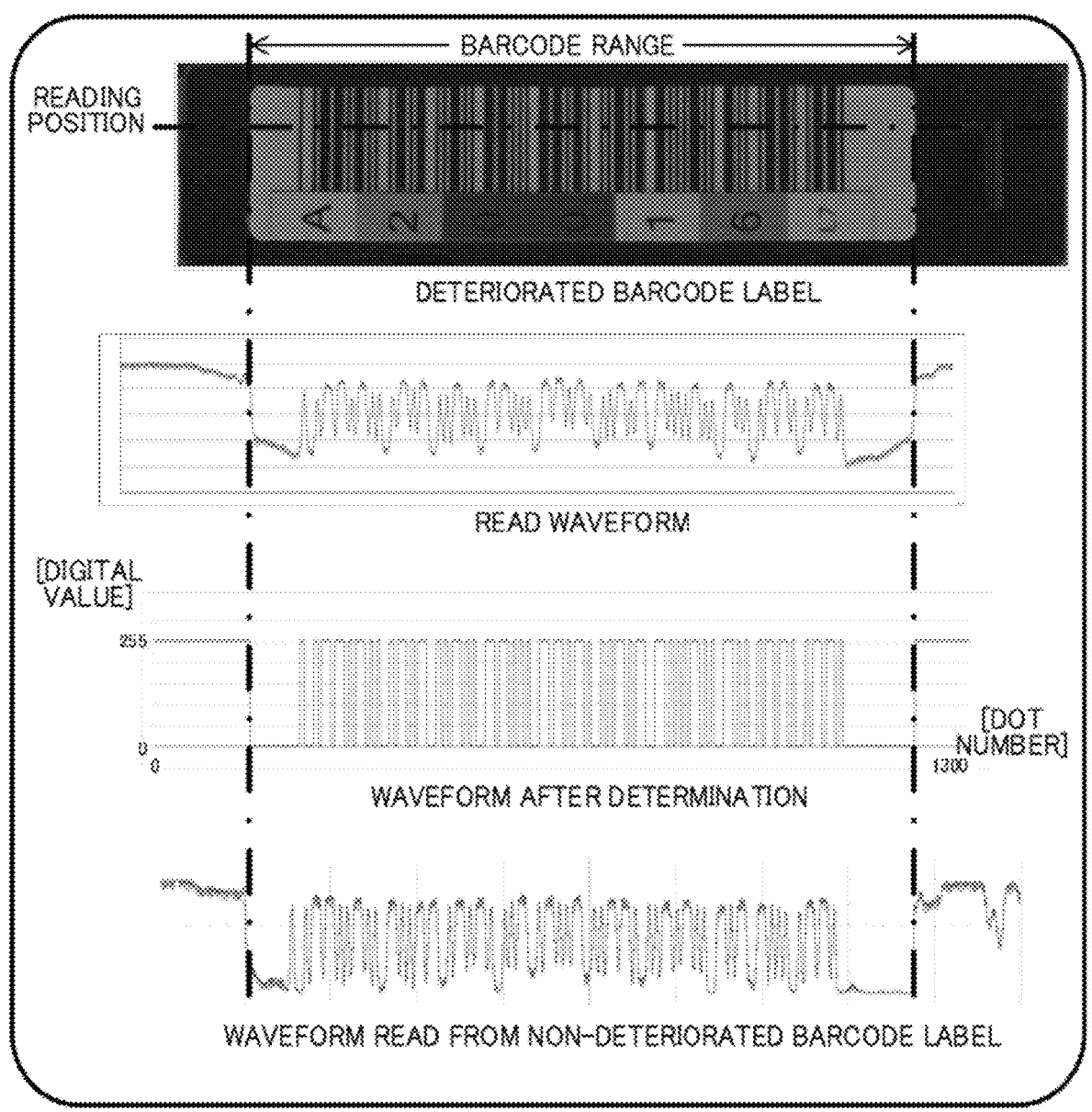
FIG. 14 is a diagram illustrating a waveform obtained through a white/black determining process according to an embodiment on a waveform read from a deteriorated barcode label.

FIG. 14 is a diagram illustrating a waveform obtained by carrying out the white/black determination of one embodiment on a read waveform of a deteriorated barcode label 6a.

As illustrated in FIG. 14, a deteriorated barcode label 6a has a small difference in the obtained voltage level of the read waveform between a read value of a black bar of the barcode label 6a and a read value of a white bar of the same barcode label 6a and further has a declined white/black determination margin (see "READ WAVEFORM"), which is caused by deviation of the obtained voltage level due to unevenness in lighting. However, the white/black determination of one embodiment can correctly read the barcode (see "WAVEFORM AFTER DETERMINATION").

When a non-deteriorated barcode label 6a is read, the difference in the obtained voltage level of the read waveform is large. For this reason, even the traditional determination method can correctly read the barcode (see "WAVEFORM READ FROM NON-DETERIORATED BARCODE LABEL").

(1-4) Example of the Operation

Next, description will now be made in relation to an example of the operation of the determination apparatus 20 of the barcode reader 10 having the above configuration with reference to FIG. 15.

Figure 15:
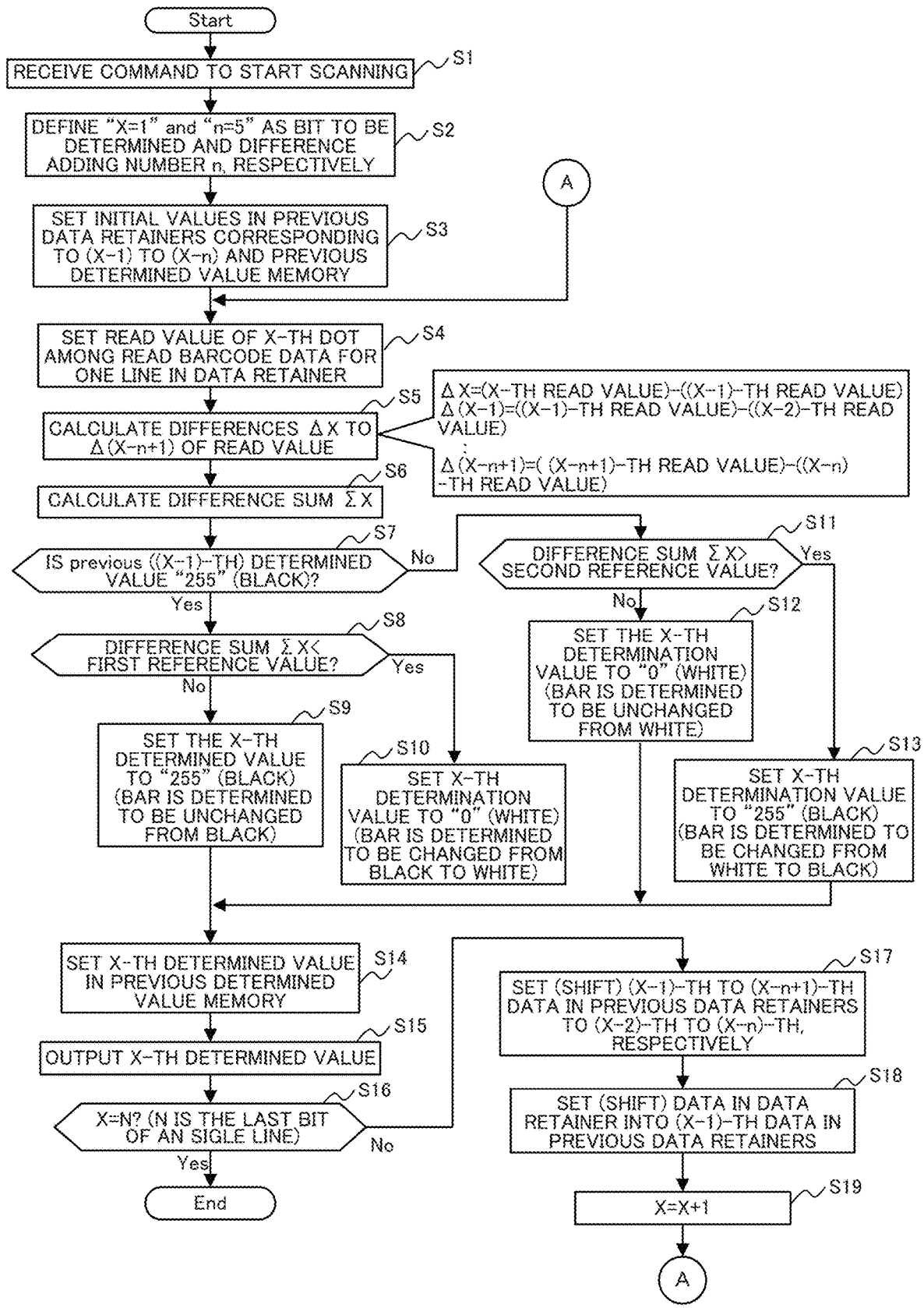
FIG. 15 is a flow chart illustrating an example of an operation of a white/black determining process performed by a determination apparatus of an embodiment.

Here, the white/black determining process of FIG. 15 indicates a cases where the read values for one line obtained by a single scanning on the barcode label 6a are sequentially input from the A/D converter 13 to the determination apparatus 20.

As illustrated in FIG. 15, upon receiving a barcode reading command instructing to start scanning the barcode from the upper controller 8 (Step S1), the determination apparatus 20 starts scanning the barcode in obedience to the received command.

For the sake of convenience in explaining the flow chart of FIG. 15, the bit for the white/black determination and the difference sum n are defined as "X=1" and "n=5", respectively, in Step S2.

In advance to the start of the operation, the determination apparatus 20 sets data "255" (black), as the initial value, in the previous data retainers 22-0 to 22-4 and also set "black" (or "255") in the previous determined value memory 26 (Step S3).

Next, the determination apparatus 20 sets the read value of the X-th dot among barcode read data for one line which data is input from the A/D converter 13 in the data retainer 21 (Step S4).

The difference calculators 23-0 to 23-4 calculate differences $\Delta X$ to $\Delta(X-n+1)$ of the read values on the basis of the read values provided from the corresponding data retainer 21 and the corresponding previous data retainers 22-0 to 22-4 (Step S5). Here, a difference $\Delta X$ may be calculated from an expression (X-th read value)−((X−1)-th read value) and a difference $\Delta(X-1)$-th may be calculated from an expression ((X−1)-th read value)−((X−2)-th read value). Likewise, a difference $\Delta(X-n+1)$-th may be calculated from an expression ((X−n+1)-th read value)−((X−n))-th read value).

The difference adder 24 calculates a difference sum $\Sigma X$ by adding the n differences $\Delta X$ to $\Delta(X-n+1)$ calculated by the difference calculator 23 (Step S6).

The reference-value comparator 25 determines whether or not the previous ((X−1)-th) determined value is black (e.g., "255") by referring to the previous determined value memory 26 (Step S7). In cases where the previous ((X−1)-th) determined value is black (Yes in step S7), the reference-value comparator 25 determines whether the difference sum ΣX is smaller than the first reference value (Step S8).

In cases where the difference sum ΣX is not smaller than the first reference value (No in Step S8), the reference-value comparator 25 determines that the bar is unchanged from black, consequently sets the X-th determined value to "255" (black) (Step S9), and then moves the process to Step S14.

In cases where the difference sum ΣX is smaller than the first reference value (Yes in Step S8), the reference-value comparator 25 determines that the bar changes from black to white, consequently sets the X-th determined value to "0" (white) (Step S10), and then moves the process to Step S14.

In contrast to the above, in cases where the immediate-previous ((X−1)-th) determined value is white (No in step S7), the reference-value comparator 25 determines whether the difference sum ΣX is larger than the second reference value (Step S11).

In cases where the difference sum ΣX is not larger than the second reference value (No in Step S11), the reference-value comparator 25 determines that the bar is unchanged from white, consequently sets the X-th determined value to "0" (white) (Step S12), and then moves the process to Step S14.

In cases where the difference sum ΣX is larger than the second reference value (Yes in Step S11), the reference-value comparator 25 determines that the bar changes from white to black, consequently sets the X-th determined value to "255" (black) (Step S13), and then moves the process to Step S14.

In Step S14, the reference-value comparator 25 sets the X-th determined value set in Step S9, S10, S12, or S13 in the previous determined value memory 26. The reference-value comparator 25 outputs the X-th determined value to the barcode analyzer 112 of the upper interface 11 (Step S15).

The determination apparatus 20 determines whether or not X is equal to N (reaches N) (Step S16). Here, N is the last bit of a single line and is exemplified by "N=1024" in one embodiment.

In cases where X is not equal to N (No in Step S16), the determination apparatus 20 sets (shifts) the (X−1)-th to (X−n+1)-th data in the previous data retainers 22 to the (X−2)-th to (X−n)-th data, respectively. For example, data in the previous data retainers 22-0 to 22-3 are set in the previous data retainers 22-1 to 22-4, respectively. In addition, the determination apparatus 20 sets (shifts) the data in the data retainer 21 into the (X−1)-th data in the previous data retainer 22 (Step S18). For example, the data in the data retainer 21 is set in the previous data retainer 22-0.

Then the determination apparatus 20 increases the value of X in increment of one (Step S19) and moves the process to Step S4.

In contrast, in cases where X is equal to N (Yes in Step S16), the white/black determining process on scanning data for one line is completed.

(2) Miscellaneous

A preferred embodiment of the present invention is detailed as the above. The present invention should by no means be limited to the foregoing particular embodiment, and various changes and modifications can be suggested without departing from the scope of the present invention.

For example, description made by referring to FIG. 12 assumes that the determination apparatus 20 includes five previous data retainers 22 and the five difference calculators 23. However, the determination apparatus 20 is not limited to this. Alternatively, the determination apparatus 20 may include more than three previous data retainers 22 and more than three difference calculators 23.

In the above embodiment, in the white/black determined data, "0" represents white and "255" represents black, which is however not limited to these values. Alternatively, "0" may represent black and "255" represent white. Further alternatively, a barcode may be formed of two colors except for black and white.

The above description further assumes that the determination apparatus 20 (white/black determiner 14) is installed in the barcode reader 10 of the conveyor robot 5, but the structure is not limited to this. Alternatively, the determination apparatus 20 may be included in the upper controller 8. In this alternative, it is satisfactorily that the digital data from the A/D converter 13 may be transmitted to the upper controller 8, and the determination apparatus 20 may carry out the white/black determining process in the upper controller 8.

The respective functional blocks of the barcode reader 10 and the determination apparatus 20 illustrated in FIGS. 11 and 12 may be combined in an arbitrary combination or divided.

Further, in the above description, the difference calculator 23 calculates the difference by subtracting the older one (farer to X) of the input read values of two neighboring dots from the newer one (nearer to X) of the input read values, but the calculating of a difference is not limited to this. Alternatively, the difference calculator 23 may calculate the difference by subtracting the newer one (nearer to X) of the input read values of two neighboring dots from the older one (farer to X) of the input read values.

In this alternative, the positive or negative sign of the calculated difference comes to be opposite to that of the above description. This can be dealt by inverting the signs of the first and second reference values and also inverting the sign of inequalities for the comparisons between the difference sum and a reference value. Specifically, the first reference value and the sign of inequality in determination expression in Step S8 of FIG. 15 are changed from a negative value to a positive value and from "<" to ">", respectively. Likewise, the second reference value and the sign of inequality in determination expression in Step S11 of FIG. 15 are changed from a positive value to a negative value and from ">" to "<".

As one aspect, it is possible to enhance the capability of reading a barcode.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data determination apparatus comprising:
a memory; and a processor coupled to the memory, the processor being configured to:

calculate a difference in signal values between each combination of neighboring pixels of a predetermined number of continuous pixels among a plurality of pixels forming image data of a barcode;

compare a sum of a plurality of the differences of the predetermined number of continuous pixels with a reference value; and detect, based on a result of comparing the sum of the plurality of the differences of the predetermined number of continuous pixels with the reference value, a pixel at a boundary position at which a signal value of the pixel is switched from one of a first value and a second value to a remaining one of the first value and the second value among the plurality of pixels forming the image data, wherein the processor determines, based on the result of the comparing, whether the signal value of a target pixel for determination among the predetermined number of continuous pixels represent the first value or the second value.

2. The data determination apparatus according to claim 1, the processor being further configured to, after the determining, shift a range of the predetermined number of continuous pixels by one pixel within the plurality of pixels forming the image data, under a state where the predetermined number is maintained; and carry out the calculating, the comparing, and the determining on the predetermined continuous pixels after the shifting.

3. The data determination apparatus according to claim 2, wherein the reference value changes with a result of the determining of the signal value of the target pixel before the shifting.

4. The data determination apparatus according to claim 2, wherein the target pixel for determination is a pixel to be incorporated into the predetermined number of continuous pixels by the shifting and is a candidate for the pixel at the boundary position.

5. The data determination apparatus according to claim 1, wherein the predetermined number is set to a number less than the number of pixels of a narrow bar in the image data of the barcode.

6. A library apparatus configured to store a plurality of recording media each displaying a barcode, the library apparatus comprising a reading apparatus configured to read a barcode of a recording medium in response to a reading instruction for a barcode, the reading apparatus comprising:

a memory; and a processor coupled to the memory, the processor being configured to:

calculate a difference in signal values between each combination of neighboring pixels of a predetermined number of continuous pixels among a plurality of pixels forming image data of a barcode;

compare a sum of a plurality of the differences of the predetermined number of continuous pixels with a reference value; and detect, based on a result of comparing the sum of the plurality of the differences of the predetermined number of continuous pixels with the reference value, a pixel at a boundary position at which a signal value of the pixel is switched from one of a first value and a second value to a remaining one of the first value and the second value among the plurality of pixels forming the image data, wherein the processor determines, based on the result of the comparing, whether the signal value of a target pixel for determination among the predetermined number of continuous pixels represents the first value or the second value.

7. The library apparatus according to claim 6, the processor being further configured to, after the determining, shift a range of the predetermined number of continuous pixels by one pixel within the plurality of pixels forming the image data, under a state where the predetermined number is maintained; and carry out the calculating, the comparing, and the determining on the predetermined continuous pixels after the shifting.

8. The library apparatus according to claim 7, wherein the reference value changes with a result of the determining of the signal value of the target pixel before the shifting.

9. The library apparatus according to claim 7, wherein the target pixel for determination is a pixel to be incorporated into the predetermined number of continuous pixels by the shifting and is a candidate for the pixel at the boundary position.

10. The library apparatus according to claim 6, wherein the predetermined number is set to a number less than the number of pixels of a narrow bar in the image data of the barcode.

11. A non-transitory computer-readable recording medium having stored therein a data determining program for causing a computer to execute a process comprising:

calculating a difference in signal values between each combination of neighboring pixels of a predetermined number of continuous pixels among a plurality of pixels forming image data of a barcode;

comparing a sum of a plurality of the differences of the predetermined number of continuous pixels with a reference value; and detecting, based on a result of comparing the sum of the plurality of the differences of the predetermined number of continuous pixels with the reference value, a pixel at a boundary position at which a signal value of the pixel is switched from one of a first value and a second value to a remaining one of the first value and the second value among the plurality of pixels forming the image data, wherein the detecting determines, based on the result of the comparing, whether the signal value of a target pixel for determination among the predetermined number of continuous pixels represents the first value or the second value.

12. The non-transitory computer-readable recording medium according to claim 11, the process further comprising, after the determining, shift a range of the predetermined number of continuous pixels by one pixel within the plurality of pixels forming the image data, under a state where the predetermined number is maintained; and carry out the calculating, the comparing, and the determining on the predetermined continuous pixels after the shifting.

13. The non-transitory computer-readable recording medium according to claim 12, wherein the reference value changes with a result of the determining of the signal value of the target pixel before the shifting.

14. The non-transitory computer-readable recording medium according to claim 12, wherein the target pixel for determination is a pixel to be incorporated into the predetermined number of continuous pixels by the shifting and is a candidate for the pixel at the boundary position.

15. The non-transitory computer-readable recording medium according to claim 11, wherein the predetermined number is set to a number less than the number of pixels of a narrow bar in the image data of the barcode.

* * * * *